United States Patent
Ogawa et al.

[11] Patent Number: 6,125,539
[45] Date of Patent: Oct. 3, 2000

[54] PROCESS FOR PRODUCING VIBRATION ISOLATOR

[75] Inventors: Yuichi Ogawa; Rentaro Kato, both of Kasugai; Naoki Nishikawa, Oyama; Masatoshi Enomoto, Oyama; Shoichi Satoh, Oyama, all of Japan

[73] Assignees: Tokai Rubber Industries, Ltd., Komaki; Showa Aluminum Corporation, Sakai, both of Japan

[21] Appl. No.: 09/241,066

[22] Filed: Feb. 1, 1999

[30] Foreign Application Priority Data

Feb. 12, 1998 [JP] Japan .................................. 10-030066

[51] Int. Cl.$^7$ ...................................................... B23P 13/00
[52] U.S. Cl. .................... 29/896.93; 29/469.5; 72/354.2; 72/361; 264/262; 264/266; 264/297.5
[58] Field of Search .............................. 29/896.93, 469.5; 264/262, 266, 297.5; 72/354.2, 361

[56] References Cited

U.S. PATENT DOCUMENTS

| | | | |
|---|---|---|---|
| 2,864,130 | 12/1958 | Beare | 264/262 |
| 3,281,933 | 11/1966 | Fehling | 72/347 |
| 3,754,317 | 8/1973 | Taylor | 264/262 |
| 4,961,254 | 10/1990 | Andra et al. | 29/469.5 |

OTHER PUBLICATIONS

Haruhiko Tohara, Rubber Vibration Isolator, Revised Edition, published in Aug., 1975. pp. 49–50 (with Translation of Extract.).

*Primary Examiner*—P. W. Echols
*Attorney, Agent, or Firm*—Oblon, Spivak, McClelland, Maier, Neustadt, P.C.

[57] ABSTRACT

A process for producing a vibration isolator. The process involves steps of forming an intermediate product including an axial member, an outside member having a cylinder-shaped portion and a rubber elastic member, and drawing the cylinder-shaped portion with a drawing apparatus provided with a drawing hole at least by pressing the cylinder-shaped portion into the drawing hole. The drawing hole has a predetermined dimensional diameter being smaller than an outer peripheral diameter of the cylinder-shaped portion. Thus, the cylinder-shaped portion is reduced diametrically to plastically deform. The production process can obviate the conventional pressed-in construction in which metallic members contact with each other, can make the manufacture of the vibration isolator easy, and can reduce the manufacturing cost.

4 Claims, 6 Drawing Sheets

PROCESS FOR PRODUCING VIBRATION ISOLATOR

BACKGROUND OF THE INVENTION

1. Field of the Invention

The present invention relates to a process for producing a vibration isolator which can be appropriately used as suspension arms, engine mounts, etc., for automobiles, for example.

2. Description of the Related Art

Figure 7:
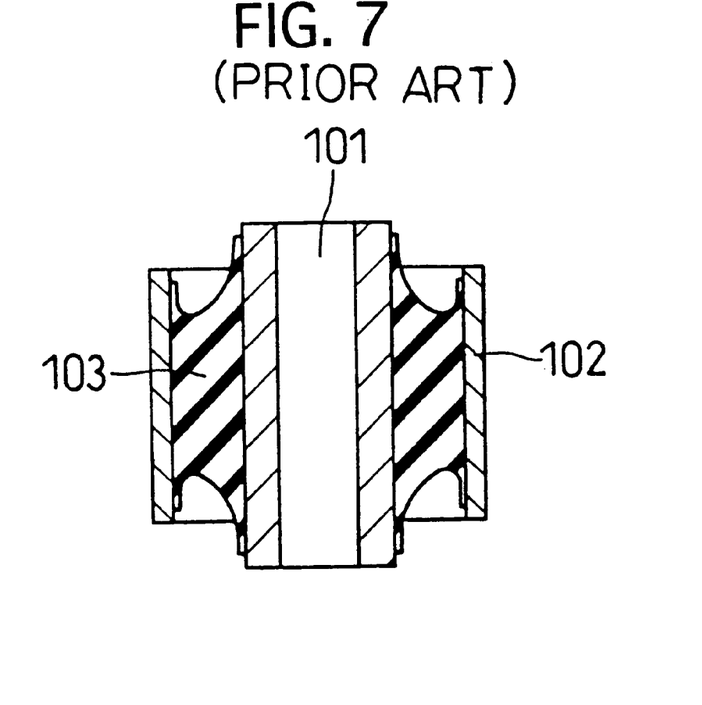
FIG. 7 is a cross-sectional view for illustrating a suspension bushing (i.e., a conventional vibration isolator)

Conventionally, a suspension bushing has been known as an insulator-and-connector device which is used at a connecting portion of a suspension arm for an automobile, for instance. As illustrated in FIG. 7, the bushing comprises a pipe-shaped inner cylindrical fitting 101, an outer cylindrical fitting 102, and a substantially-cylinder-shaped rubber elastic member 103. The outer cylindrical fitting 102 is disposed outside the inner cylindrical fitting 101 away therefrom by a predetermined distance and substantially coaxially therewith. The rubber elastic member 103 is bonded by vulcanization to an outer peripheral surface of the inner cylindrical fitting 101 and to an inner peripheral surface of the outer cylindrical fitting 102.

Figure 8:
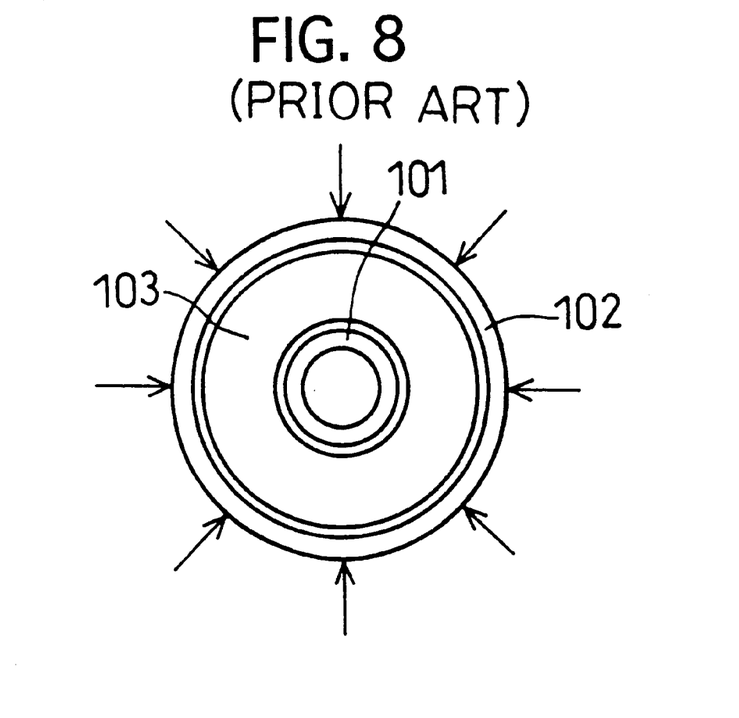
FIG. 8 is an explanatory view for illustrating how the suspension bushing (i.e., the conventional vibration isolator) is drawn.
Figure 9:
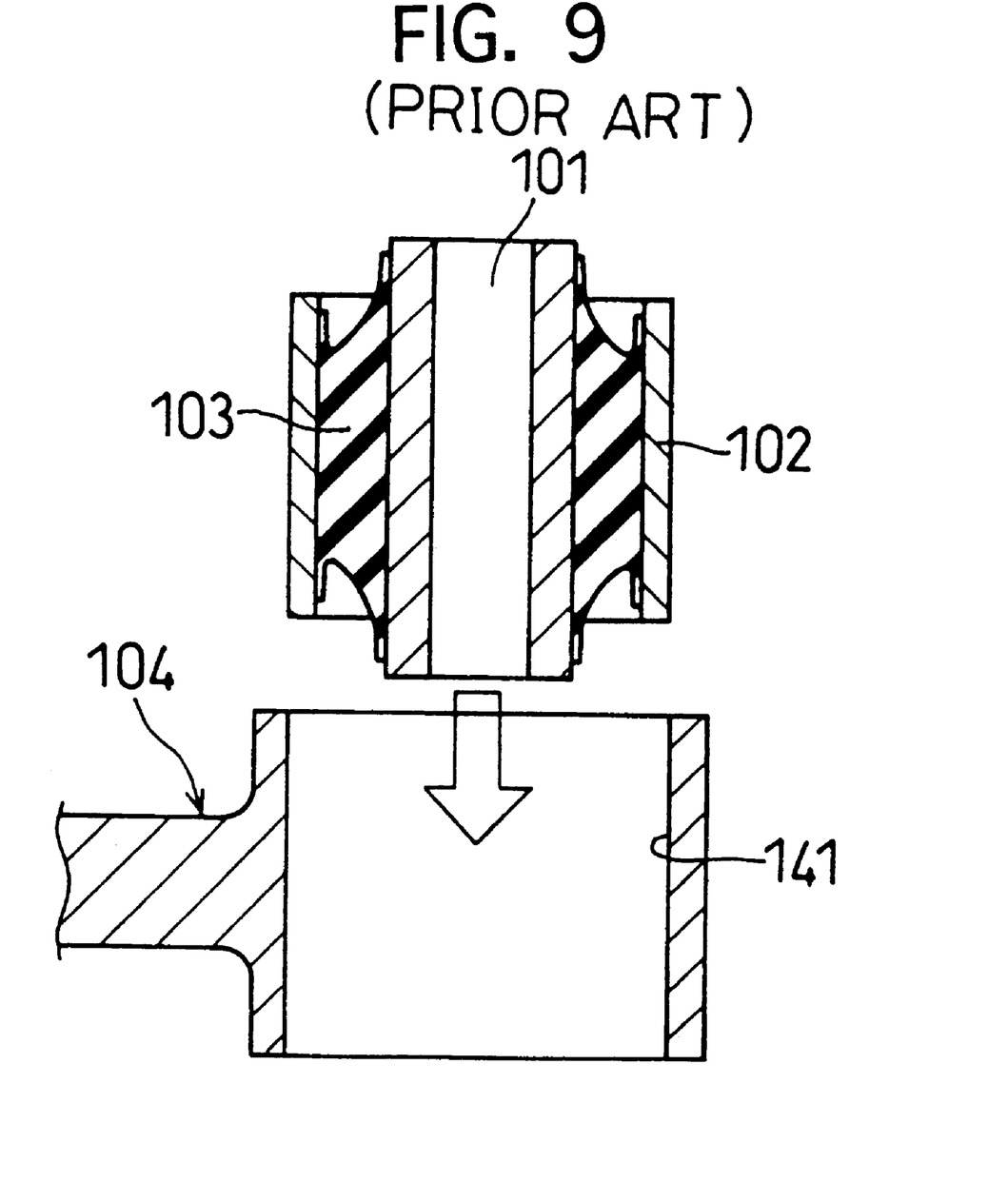
FIG. 9 is an explanatory view for illustrating how the suspension bushing (i.e., the conventional vibration isolator) is pressed into an installation hole of a suspension arm.

Taking the characteristics and durability of the rubber elastic member 103 into consideration, the bushing is subjected to a drawing process so that it is compressed and deformed inward in radial direction as illustrated in FIG. 8. Thereafter, as illustrated in FIG. 9, the bushing is fitted with and fastened to a suspension arm 104 by pressing the outer cylindrical fitting 102 into an installation hole 141 which is disposed at one end of the suspension arm 104. Then, the other installation axis, such as a connecting arm, etc., is fitted with and fastened to an inner hole of the cylindrical inner fitting 101 by fastening a bolt, or the like. Thus, the conventional bushing is put into service.

In the conventional bushing, the outside-diameter dimension of the outer cylindrical fitting 102 is required to exhibit a high accuracy because the outer cylindrical fitting 102 is fitted with and fastened to the installation hole 141 of the suspension arm 104 by pressing. However, it is difficult for the outer cylindrical fitting 102, which has been subjected to the drawing process before the pressing operation, to exhibit a satisfactory dimensional accuracy. When the outer cylindrical fitting 102 is used as it is after it has been subjected to the drawing process, it is difficult to sufficiently and stably secure the efficiency of the press-in operation and the fastening strength after the press-in operation.

For example, when the outside-diameter dimension of the outer cylindrical fitting 102 is much larger than the inside-diameter dimension of the installation hole 141 entirely in peripheral direction or partially, the galling arises during the press-in operation so that it is extremely difficult to press the outer cylindrical fitting 102 into the installation hole 141. On the other hand, when the outside-diameter dimension of the outer cylindrical fitting 102 is much smaller than the inside-diameter dimension of the installation hole 141 entirely in peripheral direction or partially, it is difficult to sufficiently secure the fastening strength after the press-in operation.

Hence, in order to secure the required dimensional accuracy, the outer cylindrical fitting 102 has been conventionally further subjected to a grinding process, and the like, after it is subjected to the drawing process. Since these special operations require special manufacturing processes and facilities, there arise problems in that the manufacture is accordingly cumbersome and results in a sharply increased manufacturing cost.

SUMMARY OF THE INVENTION

The present invention has been developed in view of the aforementioned problems. It is therefore an object of the present invention to provide a novel process for producing a vibration isolator. More particularly, the novel process can obviate the pressed-in construction in which metallic members contact with each other, can make the manufacture easy, and can reduce the manufacturing cost.

An aspect of the present invention can carry out the object, and comprises the steps of forming an intermediate product including an axial member, an outside member and a rubber elastic member, the outside member having a cylinder-shaped portion disposed outside the axial member away therefrom by a predetermined distance and substantially coaxially therewith, the rubber elastic member bonded to an outer peripheral surface of the axial member and to an inner peripheral surface of the cylinder-shaped portion and connecting the axial member and the cylinder-shaped portion integrally; and drawing the cylinder-shaped portion with a drawing apparatus provided with a drawing hole at least, the drawing hole having a predetermined dimensional diameter being smaller than an outer peripheral diameter of the cylinder-shaped portion, by pressing the cylinder-shaped portion into the drawing hole, thereby diametrically reducing the cylinder-shaped portion to plastically deform the same.

In accordance with the aspect of the present invention, at the intermediate-product forming step, the rubber elastic member is formed so that it is directly bonded to an outer peripheral surface of the axial member and to an inner peripheral surface of the cylinder-shaped portion. Thereafter, at the drawing step, the cylinder-shaped portion is pressed into the drawing hole of the drawing apparatus in axial direction, and thereby the entire cylinder-shaped portion is reduced diametrically to plastically deform. Accordingly, the rubber elastic member, which is disposed between the cylinder-shaped portion and the axial member, is compressed as the cylinder-shaped portion is reduced diametrically. Thus, an internal pressure is given to the rubber elastic member.

Hence, in accordance with the aspect of the present production process, it is possible to eliminate a component member which corresponds to the conventional outer cylindrical fitting, to easily carry out the production of the vibration isolator, and to remarkably reduce the manufacturing cost. Further, it is unnecessary to employ the special manufacturing processes, such as the grinding process, and the like, and the facilities accompanying therewith because the press-in step of the outer cylindrical fitting can be abolished. This can make the manufacture extremely easy, and can reduce the manufacturing cost further sharply. Furthermore, it is possible to relieve the constraint of high dimensional accuracy required for the cylinder-shaped portion, because the cylinder-shaped portion can be completed by only carrying out the drawing process, and is not followed by the conventional press-in operation of the outer cylindrical fitting.

The intermediate-product forming step of the present production process is a step for forming the intermediate product which is constructed so that an outer peripheral surface of the rubber elastic member, disposed between the cylinder-shaped portion of the outside member and the axial member, is bonded directly to an inner peripheral surface of the cylinder-shaped portion. Consequently, a variety of methods can be employed to connect the rubber elastic member with the cylinder-shaped portion and the axial member. For instance, the rubber elastic member can be bonded by vulcanization to the cylinder-shaped portion and the axial member when it is molded by vulcanization; or the members are formed independently and bonded together by an adhesive; or the rubber elastic member is disposed and connected by pressing it in between the cylinder-shaped portion and the axial member. As later described, when the vulcanization bonding is employed as set forth in a farther aspect of the present invention, it is possible to reduce the man-hour requirements, because the intermediate product can be formed easily and advantageously.

In the drawing process of the present production process, the cylinder-shaped portion is pressed into the drawing hole of the drawing apparatus in axial direction so that the cylinder-shaped portion is deformed elastically by reducing it diametrically. Thus, the internal pressure is given to the rubber elastic member, which is disposed between the cylinder-shaped portion and the axial member. The drawing apparatus used herein can be one apparatus selected from the group consisting of drawing apparatuses which are provided with a drawing hole which is designed to appropriately adapt to the cylinder-shaped portion to be subjected to the drawing and to the entire shape of the outside member.

In the present production process, the outside member employed is made of an aluminum alloy which exhibits a superb elongation and a high strength. For example, the outside member employed can be formed by extrusion molding, vacuum die-casting molding, or the like.

In a further aspect of the present invention, the intermediate-product forming step of the aforementioned aspect of the present invention includes a step of forming a rubber-molded body including: disposing the axial member and the outside member so that the cylinder-shaped portion is disposed outside the axial member substantially coaxially therewith in a mold; and forming a tubular rubber elastic member by vulcanization molding between the axial member and the cylinder-shaped member so that the rubber elastic member is bonded by vulcanization to an outer peripheral surface of the axial member and to an inner peripheral surface of the cylinder-shaped portion.

In accordance with the farther aspect of the present invention, when the rubber elastic member is formed by vulcanization molding, the rubber elastic member can be bonded to the axial member and to the cylinder-shaped portion simultaneously with the formation of the rubber elastic member. Hence, it is possible to reduce the man-hour requirements and to form the intermediate product with ease.

In a still farther aspect of the present invention, the following means is employed. For example, the outside member comprises: the cylinder-shaped portion and a bracket portion projecting from an outer periphery of the cylinder-shaped portion; and a hollow is formed in the bracket portion so that it penetrates through the bracket portion in direction parallel to an axial line of the cylinder-shaped portion.

In accordance with the still further aspect of the present invention, when carrying out the drawing step, the drawn surface of the cylinder-shaped portion can be secured widely by utilizing the hollow formed in the bracket. Accordingly, the drawing can be carried out more reliably and stably. Note that the hollow can preferably be positioned in the bracket so that it goes along an outer peripheral surface of the cylinder-shaped portion as parallel as possible.

For instance, when an axial member, an outside member and a rubber elastic member are bonded by vulcanization, the cylinder-shaped portion is drawn to such an extent that the rubber elastic member is compressed by a preliminary compression rate of from 3 to 10% in radial direction and the outside member is drawn within a permissible elongation range of metallic aluminum (e.g., 18% for extruded metallic aluminum).

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The preferred embodiments of the present invention win be hereinafter described with reference to the accompanying drawings.

First Preferred Embodiment

Figure 1:
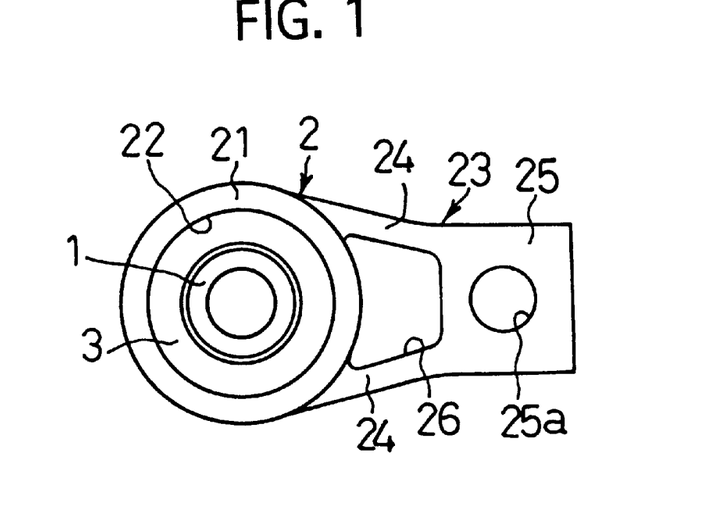
FIG. 1 is a plan view for illustrating a vibration isolator which is manufactured in accordance with a First Preferred Embodiment of the present invention.

The First Preferred Embodiment is a process for manufacturing a vibration isolator which forms an end of a suspension arm for equipment an automobile. As illustrated in FIG. 1, the vibration isolator comprises a cylinder-shaped axial member 1, an outside member 2, and a substantially-cylinder-shaped rubber elastic member 3. The outside member 2 is made of an aluminum alloy, and includes a cylinder-shaped portion 21 and a bracket 23. The cylinder-shaped portion 21 is disposed outside the axial member 1 away therefrom by a predetermined distance and coaxially therewith, and has an installation hole 22 which is formed therein and penetrates threrethrough in axial direction. The bracket 23 protrudes from an outer periphery of the cylinder-shaped portion 21, and has a mounting hole 25a and a hollow 26 which are formed therein. The rubber elastic member 3 is bonded by vulcanization to an outer peripheral surface of the axial member 1 and to an inner peripheral surface of the cylinder-shaped portion 21, and is compressed by the axial member 1 and the cylinder-shaped portion 21 so that an internal pressure is given thereto.

The vibration isolator is manufcatured by carrying out an intermediate-product forming step and a drawing step. The intermediate-product forming step includes a preparatory step and a rubber-molded body forming step as hereinafter described.

First, at the preparatory step of the intermediate-product forming step, the axial member 1 and the outside member 2 are prepared. The axial member 1 is made of an aluminum alloy so that it is formed as a cylinder shape of a predetermined size. As illustrated in FIG. 1, the outside member 2 includes the cylinder-shaped portion 21 and the bracket 23. The cylinder-shaped member 21 has the installation hole 22 which is formed therein and penetrates threrethrough in axial direction. The bracket 23 includes a pair of legs 24, 24 and a squared-block-shaped connector 25. The legs 24, 24 protrude from an outer periphery of the cylinder-shaped portion 21 in the substantially same direction. The connector 25 is connected with the protruding leading ends of the legs 24, 24, and has the mounting hole 25a formed therein.

Between the pair of legs 24, 24, there is formed the hollow 26 which is formed together with the outer peripheral surface of the cylinder-shaped portion 21 and the outer peripheral surface of the connector 25. The hollow 26 is formed parallelly to the installation hole 22 and mounting hole 25a in axial direction. The outside member 2 is made of an aluminum alloy by extrusion molding.

At the subsequent rubber-molded body forming step, a mold is prepared for molding, mold which is adapted to mold the rubber elastic member 3 by vulcanization molding. In the mold, the axial member 1 and the outside member 2 are disposed so that the cylinder-shaped portion 21 is disposed outside the axial member 1 substantially coaxially therewith. Under the circumstances, a rubber molding material is injected into a cavity which is formed between the axial member 1 and the cylinder-shaped portion 21, thereby carrying out a vulcanization molding process. Thus, the cylinder-shaped rubber elastic member 3 is formed between the axial member 1 and the cylinder-shaped portion 21. Accordingly, a rubber-molded body (i.e., an intermediate product) is formed. In the rubber-molded body, the rubber elastic member 3 is bonded by vulcanization to the outer peripheral surface of the axial member 1 and the inner peripheral surface of the cylinder-shaped portion 21 so that it is formed integrally with the axial member 1 and the cylinder-shaped portion 21.

Figure 2:
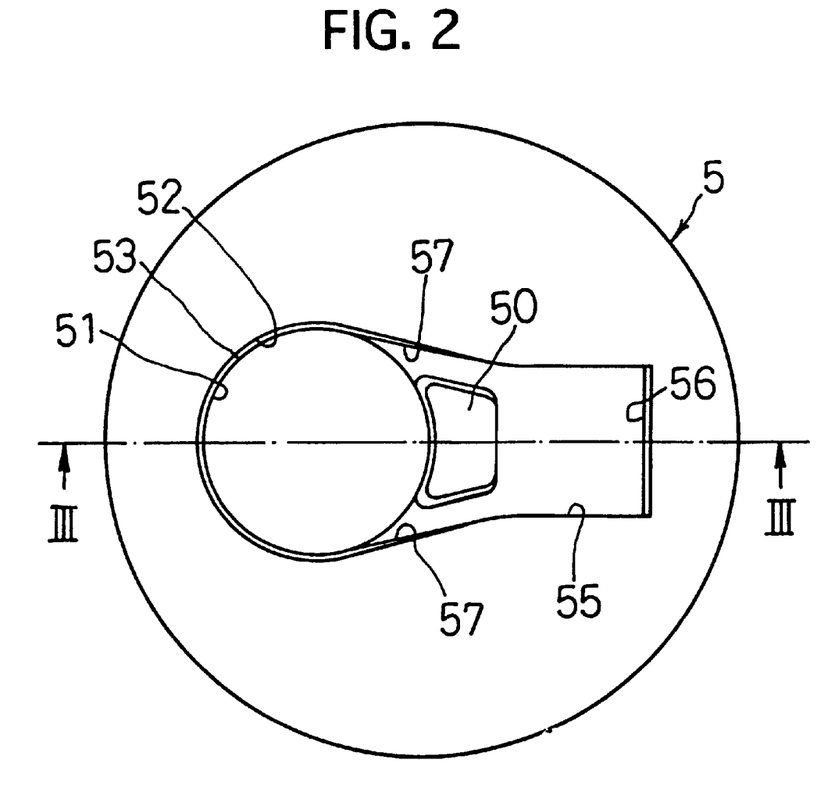
FIG. 2 is a plan view for illustrating a die of a drawing apparatus which is used in the First Preferred Embodiment of the present invention.
Figure 3:
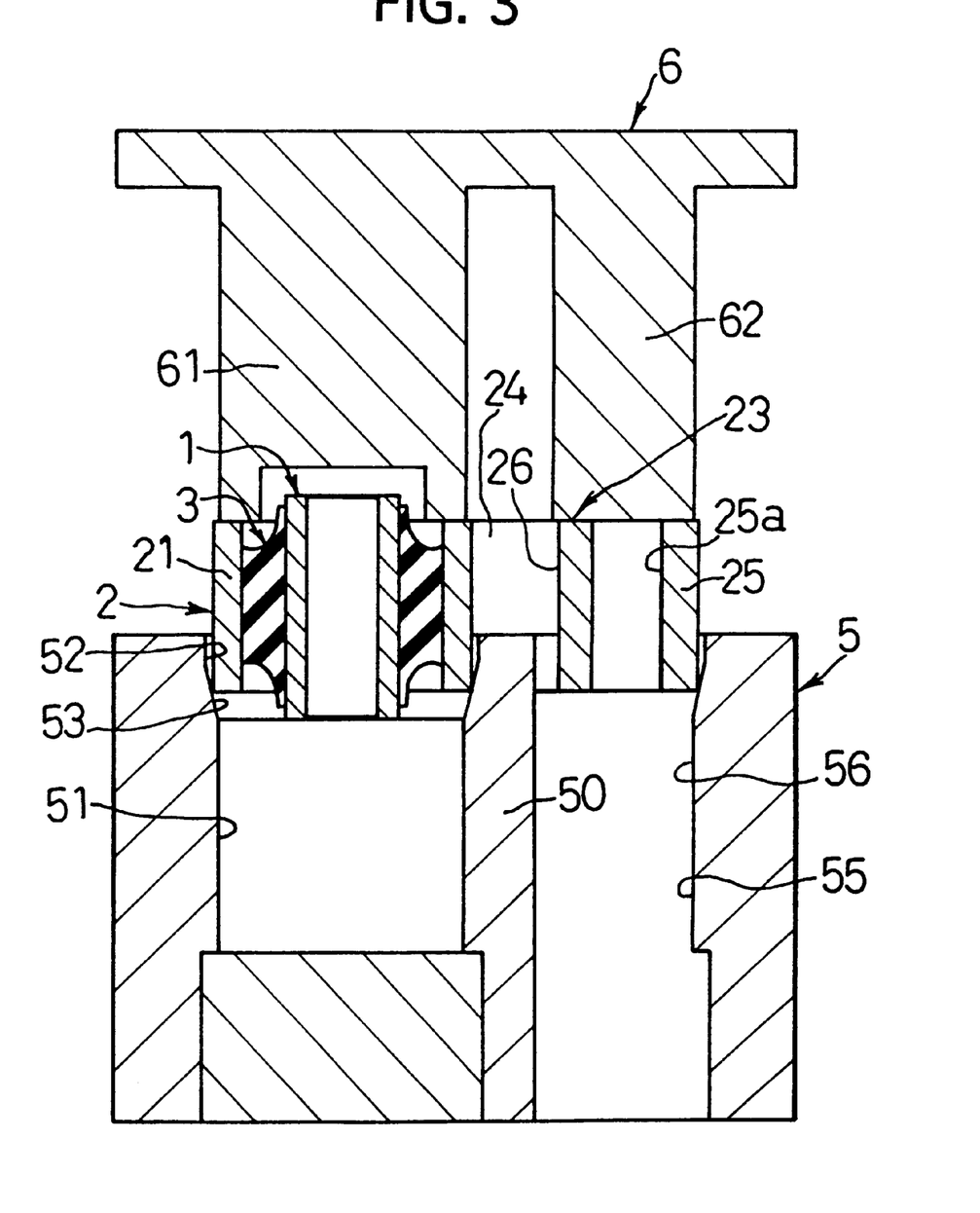
FIG. 3 is a cross-sectional view for illustrating the drawing apparatus which is taken in the direction of the arrow III—III of FIG. 2.

Then, at the following drawing step, the rubber-molded body obtained at the preceding step is subjected to drawing by using a drawing apparatus as illustrated in FIGS. 2 and 3. The drawing apparatus used herein is provided with a die 5 and a pressing unit 6. As illustrated in FIG. 2, the die 5 has a first drawing hole 51 into which the cylinder-shaped portion 21 is fitted, and a second drawing hole 55 which is formed continuously and parallelly to the first drawing hole 51 and into which the bracket 23 is fitted. As illustrated in FIG. 3, the pressing unit 6 has a first punch 61 which is inserted into the first drawing hole 51, and a second punch 62 which is inserted into the second drawing hole 55.

As illustrated in FIG. 2, the die 5 has a pillar-shaped core 50. The pillar-shaped core 50 is disposed at a position corresponding to the hollow 24 of the outside member 2, and is adapted to form a part of a wall surface of the first drawing hole 51 and a part of a wall surface of the second drawing hole 55. The first drawing hole 51 is designed so that it has a diameter of a predetermined dimension (or predetermined inside diameter) which is smaller than an outer peripheral diameter (outside diameter) of the cylinder-shaped portion 21. As illustrated in FIG. 3, on an opening side of the first drawing hole 51, there are formed an introducing hole 52 and a tapered guiding hole 53. The introducing hole 52 has a diameter which is lager than the outer peripheral diameter of the cylinder-shaped portion 21. The guiding hole 53 is disposed between the introducing hole 52 and the drawing hole 51, and is tapered from a large diameter to a small diameter in the direction away from the introducing hole 52 to the drawing hole 51.

As illustrated in FIG. 2, the second drawing hole 55 has an outer peripheral shape which corresponds to an outer peripheral shape of the bracket 23 of the outside member 2. On an opposite-side surface of the second drawing hole 55 with respect to the first drawing hole 51 (or the surface of the second drawing hole 55 corresponding to the protruding leading-end surface of the connector 25 to be fitted into the second drawing hole 55), there is formed a drawing surface 56. On other surfaces of the second drawing hole 55 that corresponding to outside surfaces of the pair of legs 24, 24, there are formed other drawing surfaces 57, 57. The drawing surfaces 56, 57, 57 are adapted so that they follow the dimensional variation after the cylinder-shaped member 21 is drawn (or after the cylinder-shaped member 21 is reduced diametrically).

When carrying out a drawing operation by the drawing apparatus, as illustrated in FIGS. 2 and 3, the cylinder-shaped member 21 of the outside member 2 is fitted into the introducing hole 52 of the first drawing hole 51 of the die 5, and simultaneously the bracket 23 is disposed so that it is fitted into the opening of the second drawing hole 55. Then, the leading end surfaces of the first punch 61 and second punch 62 of the pressing unit 6 are brought into contact with the upper-end surfaces of the cylinder-shaped portion 21 and bracket 23 of the outside member 2, respectively. Thereafter, the pressing unit 6 is descended in the axial direction.

Figure 4:
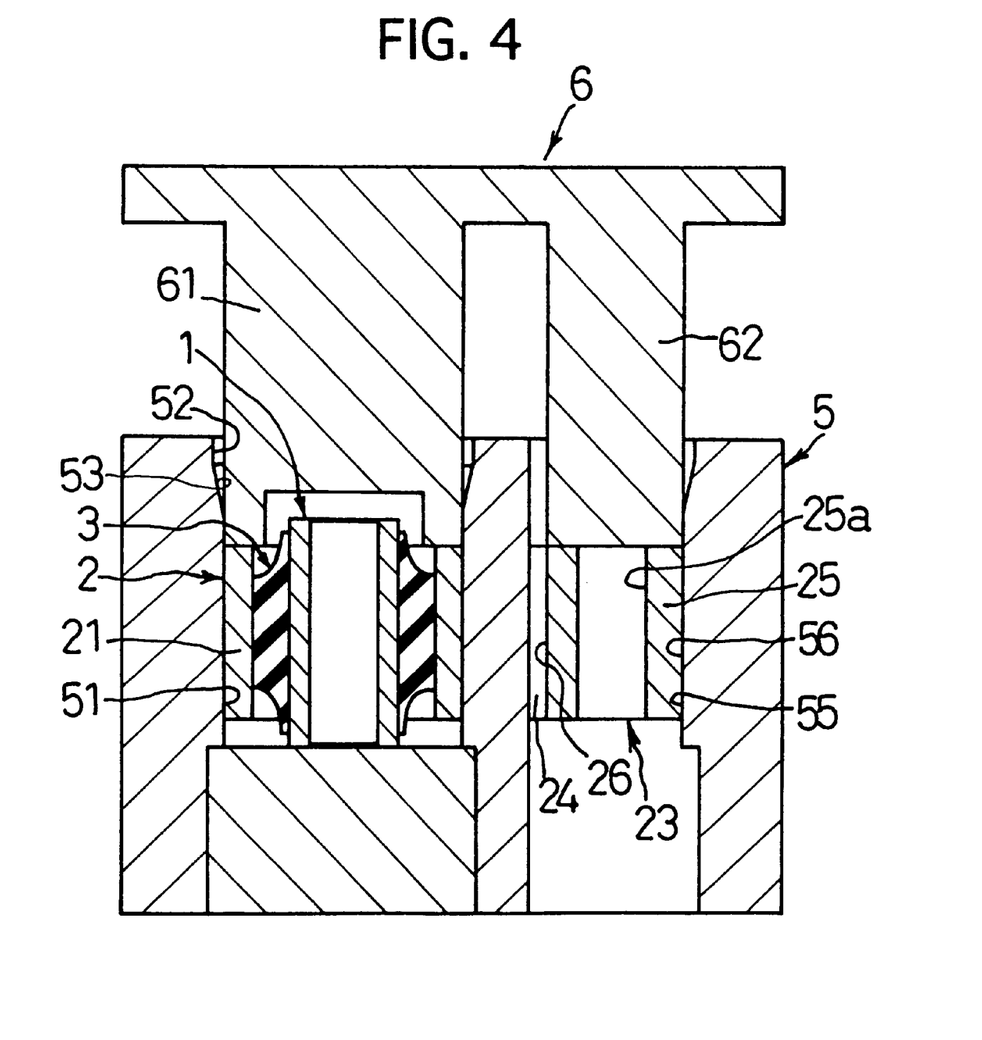
FIG. 4 is a cross-sectional view for illustrating the drawing apparatus and how an intermediate product is drawn by the drawing apparatus in the First Preferred Embodiment of the present invention.

Thus, as illustrated in FIG. 4, the cylinder-shaped portion 21 is pressed into the first drawing hole 51 through the introducing hole 52 by way of the guiding hole 53 while it is reduced diametrically. Thus, the cylinder-shaped portion 21 is deformed plastically. Consequently, the rubber elastic member 3, which is disposed between the cylinder-shaped portion 21 and the axial member 1, is compressed by the cylinder-shaped portion 21 and the axial member 1 so that it is subjected to an pressure. Simultaneously therewith, the bracket 23 is pressed by the second punch 62, and is pressed into the second drawing hole 55 while it is regulated by the drawing surfaces 56, 57, 57. Thus, the bracket 23 is plastically deformed so as to follow the dimensional variation which is accompanied by the drawing (or the diametric reduction) of the cylinder-shaped portion 21. For instance, as the cylinder-shaped portion 21 is drawn (or reduced diametrically), the pair of legs 24, 24 are deformed so that they approach each other on the sides of the cylinder-shaped portion 21. At the same time, the connector 25 is displaced 80 that it approaches the cylinder-shaped portion 21. Thus, depending on the magnitude of the drawing of the cylinder-shaped portion 21, the outside member 2 is reduced entirely.

After carrying out the drawing operation to the outside member 2 as described above, the intermediate product is taken out of the first drawing hole 51 and second drawing hole 52 of the die 5. Then, the intermediate product is subjected to an after treatment to complete the vibration isolator illustrated in FIG. 1.

As described so far, the First Preferred Embodiment of the present vibration-isolator production process is carried out in the following manner: namely, at the intermediate-product forming step, the intermediate product (or the rubber-molded body) is formed so that the rubber elastic member 3 is directly bonded to an outer peripheral surface of the axial member 1 and to an inner peripheral surface of the cylinder-shaped portion 21; and thereafter, at the drawing step, the cylinder-shaped portion 21 is pressed into the first drawing hole 51 of the drawing apparatus in axial direction, and thereby the entire cylinder-shaped portion 21 is reduced diametrically to plastically deform. Thus, an internal pressure is given to the rubber elastic member 3, which is disposed between the cylinder-shaped portion 21 and the axial member 1.

Hence, in accordance with the First Preferred Embodiment of the present vibration-isolator production process, it is possible to eliminate a component member which corresponds to the conventional outer cylindrical fitting, to easily carry out the production of the vibration isolator, and to remarkably reduce the manufacturing cost. Further, it is unnecessary to employ the special manufacturing processes, such as the grinding process, and the like, and the facilities accompanying them because the press-in step of the outer cylindrical fitting can be abolished. This can make the manufacture extremely easy, and can reduce the manufacturing cost sharply. Furthermore, it is possible to relieve the high dimensional accuracy requirement for the cylinder-shaped portion, because the cylinder-shaped portion 21 can be completed by only carrying out the drawing process, and is not followed by the conventional press-in operation of the outer cylindrical fitting.

Moreover, the intermediate-product forming step of the First Preferred Embodiment of the present vibration-isolator production process is carried out in the following manner: namely, when the rubber elastic member 3 is formed by vulcanization molding, it is formed integrally with the axial member 1 and the outside member 2; and, simultaneously with the formation of the rubber elastic member 3, the rubber elastic member 3 is bonded directly to the axial member 1 and to the cylinder-shaped portion 21. Hence, it is possible to reduce the man-hour requirements and to form the intermediate product with ease.

Second Preferred Embodiment

Figure 5:
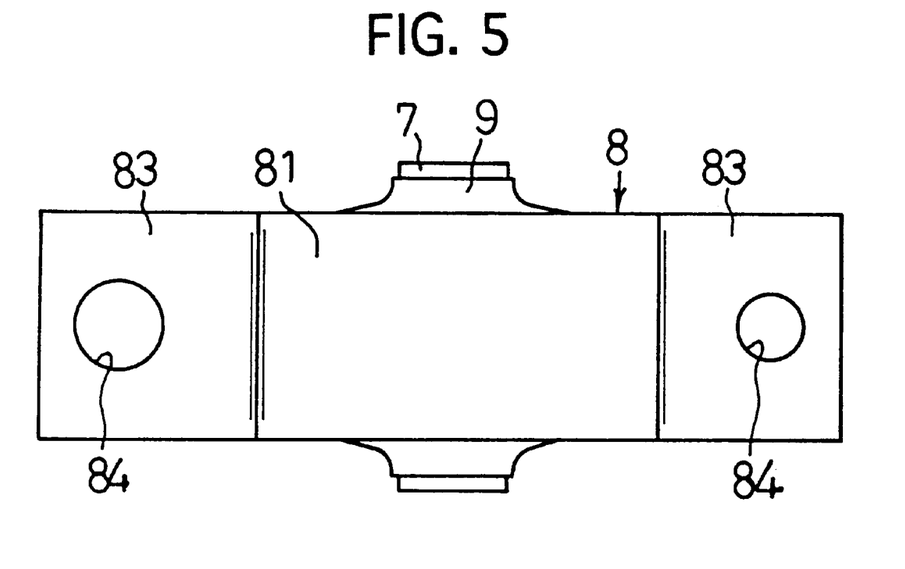
FIG. 5 is a plan view for illustrating a vibration isolator which is manufactured in accordance with a Second Preferred Embodiment of the present invention.
Figure 6:
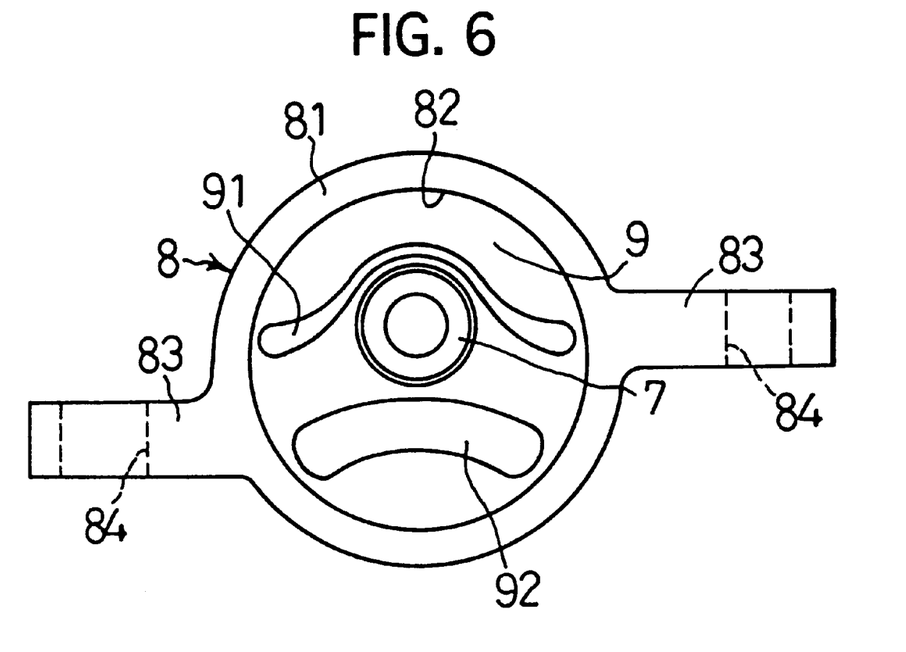
FIG. 6 is a front view for illustrating the vibration isolator which is manufactured in accordance with the Second Preferred Embodiment of the present invention.

The Second Preferred Embodiment is a process for manufacturing a vibration isolator which is used as an engine mount. The engine mount supports an engine to be boarded on an automobile, and isolates the vibrations generated therefrom. As illustrated in FIGS. 5 and 6, the vibration isolator comprises a cylinder-shaped axial member 7, an outside member 8 made of an aluminum alloy, and a substantially-cylinder-shaped rubber elastic member 9. The outside member 8 includes a cylinder-shaped portion 81 and brackets 83, 83. The cylinder-shaped portion 81 is disposed outside the axial member 7 away therefrom by a predetermined distance and coaxially therewith, and has an installation hole 82 which is formed therein and penetrates threrethrough in axial direction. The brackets 83, 83 protrude from an outer periphery of the cylinder-shaped portion 81, and have a mounting hole 84 which is formed therein. The rubber elastic member 9 is bonded by vulcanization to an outer peripheral surface of the axial member 7 and to an inner peripheral surface of the cylinder-shaped portion 81, and is compressed by the axial member 7 and the cylinder-shaped portion 81 so that an internal pressure is given thereto. Moreover, the rubber elastic member 9 has two through holes 91, 92 which penetrate in axial direction.

Similarly to the aforementioned First Preferred Embodiment, the vibration isolator is manufactured by carrying out an intermediate-product forming step and a drawing step. The intermediate-product forming step includes a preparatory step and a rubber-molded body forming step.

First, at the preparatory step of the intermediate-product forming step, the axial member 7 and the outside member 8 are prepared, The axial member 7 is made of an aluminum alloy so that it is formed as a cylinder shape of a predetermined size. As illustrated in FIG. 6, the outside member 8 includes the cylinder-shaped portion 81 and the pair of plate-shaped brackets 83, 83 The cylinder-shaped member 81 has the installation hole 82 which is formed therein and penetrates threrethrough in axial direction. The brackets 83, 83 protrude from an outer periphery of the cylinder-shaped portion 81 outward, and have a mounting hole 84 therein. The outside member 8 is formed of an aluminum alloy by extrusion molding.

At the subsequent rubber-molded body forming step, a mold is prepared for molding, mold which is adapted to mold the rubber elastic member 9 by vulcanization molding. In the mold, the axial member 7 and the outside member 8 are disposed so that the cylinder-shaped portion 81 is disposed outside the axial member 7 substantially coaxially therewith. Under the circumstances, a rubber molding material is injected into a cavity which is formed between the axial member 7 and the cylinder-shaped portion 81, thereby carrying out a vulcanization molding process. Thus, the cylinder-shaped rubber elastic member 9 is formed between the axial member 7 and the cylinder-shaped portion 81. Accordingly, a rubber-molded body (i.e., an intermediate product) is formed. In the rubber-molded body, the rubber elastic member 9 is bonded to the outer peripheral surface of the axial member 7 and the inner peripheral surface of the cylinder-shaped portion 81 so that it is formed integrally with the axial member 7 and the cylinder-shaped portion 81.

Then, at the following drawing step, the rubber-molded body obtained at the preceding step is subjected to drawing by using a drawing apparatus which is similar to the one used in the above-described First Preferred Embodiment. The drawing apparatus used herein is provided with a die which has a first drawing hole and second drawing holes. The first drawing hole is formed so that it corresponds to the outer peripheral configuration of the outside member 81. Note that the cylinder-shaped portion 81 is fitted into the first drawing hole, and that the brackets 83, 83 are fitted into the second drawing holes. In the same fashion as the First Preferred Embodiment, on an opening side of the first drawing hole, there are formed an introducing hole of a major diameter and a tapered guiding hole. Further, on surfaces of the second drawing holes, there are formed drawing surfaces. The drawing surfaces are adapted so that they follow the dimensional variation after the cylinder-shaped member 81 is drawn (or after the cylinder-shaped member 81 is reduced diametrically). Furthermore, a pressing unit of the drawing apparatus is provided with a punch which is formed as an integral body so that it can be inserted into both of the first drawing hole and the second drawing holes simultaneously.

When carrying out a drawing operation by the drawing apparatus, the cylinder-shaped member 81 of the outside member 8 is fitted into the introducing hole of the first drawing hole of the die, and simultaneously the brackets 23, 23 are disposed so that they are fitted into the openings of the second drawing holes. Then, the leading end surfaces of the punch of the pressing unit are brought into contact with the upper-end surfaces of the cylinder-shaped portion 81 and brackets 83, 83 of the outside member 8, respectively. Thereafter, the pressing unit is descended in axial direction.

Thus, the cylinder-shaped portion 81 is pressed into the first drawing hole while it is reduced diametrically. Thus, the cylinder-shaped portion 81 is deformed plastically. Consequently, the rubber elastic member 9, which is disposed between the cylinder-shaped portion 81 and the axial member 7, is compressed by the cylinder-shaped portion 81 and the axial member 7 so that it is subjected to an internal pressure. Simultaneously therewith, the brackets 83, 83 are pressed into the second drawing holes while they are regulated by the drawing surfaces. Thus, the brackets 83, 83 are plastically deformed so that they follow the dimensional variation which is accompanied by the drawing (or the diametric reduction) of the cylinder-shaped portion 81. Thus, depending on the magnitude of the drawing of the cylinder-shaped portion 81, the outside member 8 is reduced entirely.

After carrying out the drawing operation to the outside member 8 as described above, the intermediate product is taken out of the first drawing hole and second drawing holes of the die. Then, the intermediate product is subjected to an after treatment to complete the vibration isolator illustrated in FIGS. 5 and 6.

As described so far, the Second Preferred Embodiment of the present vibration-isolator production process is carried out in the following manner: namely, at the intermediate-product forming step, the intermediate product (or the rubber-molded body) is formed so that the rubber elastic member 9 is directly bonded to an outer peripheral surface of the axial member 7 and to an inner peripheral surface of the cylinder-shaped portion 81; and thereafter, at the drawing step, the cylinder-shaped portion 81 is pressed into the first drawing hole of the drawing apparatus in axial direction, and thereby the entire cylinder-shaped portion 81 is reduced diametrically to plastically deform. Thus, an internal pressure is given to the rubber elastic member 9, which is disposed between the cylinder-shaped portion 81 and the axial member 7.

Hence, in accordance with the Second Preferred Embodiment of the present vibration-isolator production process, it is possible to eliminate a component member which corresponds to the conventional outer cylindrical fitting, to easily carry out the production of the vibration isolator, and to remarkably reduce the manufacturing cost. In addition, it is needless to say that the Second Preferred Embodiment can operate and produce the other advantages in the same manner as the aforementioned First Preferred Embodiment.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a vibration isolator, comprising the steps of:

forming an intermediate product including an axial member, an outside member and a rubber elastic member, the outside member having a cylinder-shaped portion disposed outside the axial member away therefrom by a predetermined distance and substantially coaxially therewith, the outside member furthermore having a bracket portion protruding from an outer peripheral surface of the cylinder-shaped portion in a radial direction, the bracket member being formed integrally with the cylinder-shaped portion, the rubber elastic member bing bonded to an outer peripheral surface of the axial member and to an inner peripheral surface of the cylinder-shaped portion and connecting the axial member and the cylinder-shaped portion integrally; and drawing the cylinder-shaped portion with a drawing apparatus provided with a first drawing hole having a predetermined dimensional diameter being smaller than an outer peripheral diameter of the cylinder-shaped portion, and a second drawing hole guiding a protruding leading-end portion of the bracket portion into the cylinder-shaped portion side, by pressing the outside member into the first drawing hole and the second drawing hole along an axial direction of the cylinder-shaped portion, thereby diametrically reducing the cylinder-shaped portion to plastically deform the same, simultaneously making the bracket portion follow the dimensional variation of the cylinder-shaped portion to plastically deform the same.

2. The process according to claim 1, wherein said intermediate-product forming step includes a step of forming a rubber-molded body including: disposing the axial member and the outside member so that the cylinder-shaped portion is disposed outside the axial member substantially coaxially therewith in a mold; and forming a tubular rubber elastic member by vulcanization molding between the axial member and the cylinder-shaped member so that the rubber elastic member is bonded by vulcanization to an outer peripheral surface of the axial member and to an inner peripheral surface of the cylinder-shaped portion.

3. The process according to claim 1, wherein the outside member comprises the cylinder-shaped portion and a bracket portion projecting from an outer periphery of the cylinder-shaped portion;

a hollow is formed in the bracket portion of the outside member so that it penetrates through the bracket portion in a direction parallel to an axial line of the cylinder-shaped portion; and the drawing apparatus has a pillar-shaped core guiding a wall surface of the hollow at the cylinder-shaped side.

4. The process according to claim 1, wherein the drawing hole of the drawing apparatus includes an introducing hole and a tapered guiding hole on an opening side thereof, the introducing hole having a diameter being larger than the outer peripheral diameter of the cylinder-shaped portion, the tapered guiding hole disposed between the introducing hole and the drawing hole and is tapered from a large diameter to a small diameter in direction away from the introducing hole to the drawing hole.

* * * * *